(12) United States Patent
Rajadurai et al.

(10) Patent No.: US 11,635,448 B2
(45) Date of Patent: Apr. 25, 2023

(54) HETERODYNE SCANNING PROBE MICROSCOPY METHOD AND SCANNING PROBE MICROSCOPY SYSTEM

(71) Applicant: Nederlandse Organisatie voor toegepast-natuurwetenschappelijk onderzoek TNO, 's-Gravenhage (NL)

(72) Inventors: Sri Ram Shankar Rajadurai, Delft (NL); Daniele Piras, Amsterdam (NL); Kodai Hatakeyama, Pijnacker (NL); Paul Louis Maria Joseph Van Neer, Bergschenhoek (NL); Maarten Hubertus Van Es, Voorschoten (NL); Hamed Sadeghian Marnani, Nootdorp (NL); Marcus Johannes Van Der Lans, Hillegom (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/612,507

(22) PCT Filed: May 22, 2020

(86) PCT No.: PCT/NL2020/050329
§ 371 (c)(1),
(2) Date: Nov. 18, 2021

(87) PCT Pub. No.: WO2020/236002
PCT Pub. Date: Nov. 26, 2020

(65) Prior Publication Data
US 2022/0229088 A1    Jul. 21, 2022

(30) Foreign Application Priority Data

May 21, 2019  (EP) .................................. 19175565

(51) Int. Cl.
*G01Q 60/36* (2010.01)
*G01Q 60/34* (2010.01)
(Continued)

(52) U.S. Cl.
CPC ............. *G01Q 60/32* (2013.01); *G01N 29/06* (2013.01); *G01N 29/0681* (2013.01);
(Continued)

(58) Field of Classification Search
CPC ........................... G01N 29/06; G01N 29/0681
See application file for complete search history.

(56) References Cited

U.S. PATENT DOCUMENTS

2008/0276695 A1    11/2008  Prater et al.
2013/0018623 A1*   1/2013   Sokolov .................. G01N 3/32
                                                    702/113

FOREIGN PATENT DOCUMENTS

CN    107219379 A     9/2017
EP    3232192 A1     10/2017
(Continued)

OTHER PUBLICATIONS

European Patent Office, International Search Report in corresponding International Application No. PCT/NL2020/050329, dated Sep. 2, 2020 (2 pages).

Primary Examiner — Eliza W Osenbaugh-Stewart
(74) Attorney, Agent, or Firm — Leydig, Voit & Mayer, Ltd.

(57) ABSTRACT

The present document relates to a heterodyne scanning probe microscopy (SPM) method for subsurface imaging, and includes: applying an acoustic input signal to a sample and sensing an acoustic output signal using a probe. The acoustic input signal comprises a plurality of signal components at unique frequencies, including a carrier frequency and at least two excitation frequencies. The carrier fre-
(Continued)

quency and the excitation frequencies form a group of frequencies, which are distributed with an equal difference frequency between each two subsequent frequencies of the group. The difference frequency is below a sensitivity threshold frequency of the cantilever for enabling sensing of the acoustic output signal. The document also describes an SPM system.

16 Claims, 10 Drawing Sheets

(51) Int. Cl.
  *G01Q 20/02*  (2010.01)
  *G01N 29/06*  (2006.01)
  *G01Q 60/32*  (2010.01)
  *G01N 29/44*  (2006.01)
(52) U.S. Cl.
  CPC ......... *G01N 29/4436* (2013.01); *G01Q 20/02* (2013.01); *G01Q 60/366* (2013.01)

(56) References Cited

FOREIGN PATENT DOCUMENTS

EP        3349017  A1    7/2018
EP        3349020  A1    7/2018

\* cited by examiner

HETERODYNE SCANNING PROBE MICROSCOPY METHOD AND SCANNING PROBE MICROSCOPY SYSTEM

CROSS-REFERENCE TO RELATED APPLICATIONS

This patent application is a U.S. National Phase of PCT International Application No. PCT/NL2020/050329, filed May 22, 2020, which claims priority to European Application No. 19175565.1, filed May 21, 2019, which are both expressly incorporated by reference in their entireties, including any references contained therein.

FIELD OF THE INVENTION

The present invention is directed at a heterodyne scanning probe microscopy method for imaging structures on or below the surface of a sample, the method including: applying, using a transducer, an acoustic input signal to the sample; sensing an acoustic output signal using a probe, the probe including a cantilever and a probe tip, wherein the probe tip is in contact with the surface, wherein the acoustic output signal is representative of an amount of indentation of the surface by the probe tip in response to the acoustic input signal that is applied to the sample. The invention is further directed at a scanning probe microscopy system.

BACKGROUND

Acoustic scanning probe microscopy methods, such as ultrasonic atomic force microscopy (UAFM), form a class of imaging and research methods that allows the accurate imaging of sub-surface features in a sample, i.e. on or below the surface of the sample. To perform these methods, an acoustic signal is applied to the sample, either via the surface, via a backside of the sample (i.e. the side opposite the sample surface contacted to the probe), from the side or via any other portion of the sample. Other than standard scanning probe microscopy (SPM) methods, the acoustic SPM methods apply an acoustic megahertz signal to the sample which results in an impression of the probe tip into the sample surface due to the vibrations. This allows determination and mapping of the local viscoelastic properties, which to some extent causes internal structures within the sample to become detectable. Existing methods of this type for example include ultrasonic atomic force microscopy.

Although the technology allows to characterize subsurface features down to nanometer scale, the technology is sensitive to disturbances. Existing methods and systems still suffer from relatively poor signal-to-noise ratio in the response or output signal. To use the full potential of this technology, there is a need to increase the signal-to-noise ratio.

SUMMARY OF THE INVENTION

It is an object of the present invention to provide a heterodyne scanning probe microscopy (SPM) method that provides a strong output signal such as to provide a good signal-to-noise ratio (SNR).

To this end, there is provided herewith a heterodyne scanning probe microscopy method for imaging structures below the surface of a sample, the method including: applying, using a transducer, an acoustic input signal to the sample; sensing an acoustic output signal using a probe, the probe including a cantilever and a probe tip, wherein the probe tip is in contact with the surface, wherein the acoustic output signal is representative of an amount of indentation of the surface by the probe tip in response to the acoustic input signal applied to the sample; wherein the acoustic input signal comprises a plurality of signal components that each have a unique frequency, wherein the plurality of signal components comprise: a base signal component at a carrier frequency; and a plurality of additional signal components having further excitation frequencies; wherein the carrier frequency and the further excitation frequencies together form a group of frequencies, wherein the frequencies of the group of frequencies are distributed with an equal difference frequency between each two subsequent frequencies of the group; wherein the difference frequency is a frequency below a sensitivity threshold frequency for enabling said sensing of the acoustic output signal; and wherein the additional signal components are provided as sideband signal components such that in a frequency domain the further excitation frequencies of the sideband signal components are arranged at either side of the carrier frequency of the base signal component, wherein at least two sideband signal components are arranged at either side of the carrier frequency.

The present invention applies a base signal component at a carrier frequency with two or more additional signal components at further excitation frequencies on either side of the carrier frequency (in the frequency domain). The carrier and excitation frequencies applied all have equal mutual frequency differences such that the difference frequency (sometimes referred to as 'modulation frequency') falls within the sensitivity scale of the scanning probe microscope (SPM). The sensitivity scale is determined by the sensitivity of the cantilever itself and that of the sensing elements of the SPM system that are used for monitoring the cantilever response. The sensitivity of the cantilever is determined by the contact resonance frequency of the cantilever, which in turn is related to the cantilever metrics and design, and to the interaction parameters of the interaction between the sample surface and the probe tip.

These mixed signal components in their composition in the acoustic input signal, provide a beat signal in the acoustic input signal with high power signal bursts that are repetitive at least at a pulse repetition frequency equal to this difference frequency. In fact, each two signal components of the mixed signal having a mutual frequency difference at this difference frequency of the group will provide a contribution to the high power signal bursts in the composite acoustic input signal, which adds to the total signal power of these bursts. Thus at the difference frequency, within the sensitivity frequency range of the system, all these components aggregate to add up to provide high power signal bursts, thereby providing an excellent SNR.

In accordance with some embodiments, the carrier frequency is a frequency of at least five times a first contact resonance frequency of the cantilever, preferably at least ten times a first contact resonance frequency of the cantilever, more preferably at least twenty times a first contact resonance frequency of the cantilever. For example, the carrier frequency may be a frequency within a range of 5 MHz to 200 MHz, preferably 5 MHz to 100 MHz. The ideal carrier frequency that may be used depends on the material to be analyzed. The technology is based on measuring the local viscoelastic properties, and from this, the influence of subsurface structures on the viscoelastic properties. A suitable frequency range for the carrier frequency of the base signal component is dependent on the material properties, such as for example the material stiffness or modulus of elasticity.

The above mentioned frequency ranges work well for performing the method of the present invention on semiconductor surfaces, which form an important field of application of the present invention.

In accordance with certain preferred embodiments, the method further comprises a step of preselecting, for at least one of the additional signal components or the base signal component, at least one of a signal component amplitude or a signal component phase associated with the respective at least one signal component; and providing each signal component having the predetermined signal component amplitude or signal component phase associated therewith, such as to obtain the acoustic input signal having a desired envelope. Advantageously, it has been found that tuning the amplitudes of the signal components mutually enables to beneficially influence the envelope of the input signal. As may be appreciated, a mixed signal of two signal components will result in signal beats when the two frequencies are close to each other. A combination of three or more signals likewise provides an input signal of signal beats. The shape of the envelope of the input signal may be tuned to obtain bursts of high signal power in the input signal that provide a strong signal-to-noise ratio in the output signal responsive thereto. In addition to the amplitude or alternatively therefrom, also tuning the mutual phase of the signal components in the acoustic input signal strongly influences the shape of the envelope. The phase may be tuned to broaden the width of the signal bursts. Although this reduces the amplitude, the root-mean-square thereof is unaffected. Although the mutual phases may be tuned to any value desired, as an example the phases may be varied in steps of $\pm\pi/2$ radians (90°) between subsequent signal components.

In accordance with some of these embodiments, the preselecting of the at least one of the signal component amplitude or phase is performed such as to optimize at least one envelope parameter to obtain the acoustic input signal having the desired envelope, wherein the at least one envelope parameter is an element of a group comprising: a pulse repetition frequency, a temporal distribution of amplitudes within the envelope; a temporal distribution of powers within the envelope; an overall peak amplitude; or a root-mean-square amplitude. Advantageously, any of the above envelope parameters may be controlled by properly selecting any of the amplitudes or phases of the carrier and excitation frequencies or their mutual ratio (i.e. the ratio between such amplitudes). For example, in some embodiments, the base signal component has an amplitude A0 and each of the additional signal components has an amplitude $A_i=\alpha_i*A0$, wherein $0\le\alpha_i\le10$, preferably wherein $0\le\alpha_i\le5$, more preferable wherein $0.3\le\alpha_i\le0.7$, more preferably $0.45\le\alpha_i\le0.55$ such as $\alpha_i=0.5$.

In some embodiments, the sensitivity threshold frequency is smaller than or equal to a sixth contact resonant mode frequency of the cantilever; preferably between 130% and 70% of the first contact resonance frequency of the cantilever, more preferable between 120% and 80% of the first contact resonance frequency of the cantilever. The difference frequency may for example be chosen to be near (e.g. within 20% deviation of) the first contact resonance frequency, or near at least one of the $2^{nd}$, $3^{rd}$, $4^{th}$, $5^{th}$ or $6^{th}$ contact resonance mode frequencies of the cantilever to be measurable by the scanning probe microscope.

In some embodiments, the additional signal components are provided as sideband signal components such that in a frequency domain the further excitation frequencies of the sideband signal components are arranged at either side of the carrier frequency of the base signal component. For example, in some of these embodiments, an equal number of sideband signal components having their further excitation frequencies below and above the carrier frequency is provided. The above embodiments help to concentrate the contributions of the various signal components to aggregate in a single and periodically recurring burst of high signal power in the acoustic input signal. For example, the input signal may provide a beat signal of repetitive signal bursts, wherein the amplitude of one out of four bursts in a beat signal may in that case be significantly higher than the other three, and convey the additional signal information to be obtained. Of course, the periodicity of one out of four in the above example is merely one out of many possibilities. The periodicity could be one out of two, three, four, five, six, seven, eight, or any other plurality of bursts. In some of the above embodiments, at either side of the carrier frequency in the frequency domain, a positive finite integer number of sideband signal components is provided.

In accordance with some embodiments, the signal components include: two or more base signal components having different respective carrier frequencies; and a plurality of additional signal components at further excitation frequencies, which additional signal components are associated with each base signal component. The carrier frequency and the further excitation frequencies of each base signal component and its associated additional signal components together form a group of frequencies associated with the respective base signal component, such as to thereby form two or more groups of frequencies. The frequencies of each group of frequencies are distributed with an equal group difference frequency between each two subsequent frequencies of the group, and wherein the group difference frequency is a frequency below the sensitivity threshold frequency. It has been found that the grouping of frequencies around a plurality of carrier waves, as in the present embodiments, enables to further control the shape of signal bursts in the acoustic input signal. This may therefore be applied to optimize the method in terms of signal-to-noise ratio (SNR), for example.

In accordance with various of these embodiments, the frequencies of the various input signal components and carrier frequencies are set according to one or more of the following: the group difference frequencies of the two or more groups of frequencies are equal; or a difference between respective carrier frequencies of the two or more base signal components is a positive integer multiple times the group difference frequency of at least one of the groups of frequencies; or wherein the group difference frequencies of the two or more groups of frequencies are different. In embodiments wherein the group difference frequencies are equal, i.e. the modulation frequency is the same, the signal components aggregate in the acoustic input signal at the modulation frequency to provide a beat signal including bursts of high signal power. The envelope of the acoustic input signal may be properly shaped by modifying characteristics of the signal components (e.g. amplitude, phase), thereby changing the shape of the bursts e.g. in terms of amplitude, power and duration. In those embodiments wherein a difference between respective carrier frequencies of the two or more base signal components is a positive integer multiple times the group difference frequency of at least one of the groups of frequencies, the modulation frequency of one of the groups is a harmonic frequency of the modulation frequency of the other group. These signals therefore still interact to provide a beat signal in the input signal, but additionally the difference in modulation frequency may enable analysis of responses to each of the individual frequency groups (and associated carrier frequencies). Being able to analyze the respective responses at each modulation frequency may provide additional information on subsurface features of the sample. In those embodiments wherein the modulation frequencies are different, and in particular where none of the modulation frequencies is a harmonic frequency of the other modulation frequency, the responses to each group of frequencies may be individually analyzed by filtering or fast Fourier analysis of the output signal to separate the contributions at each modulation frequency. Hence, the various embodiments described provide several advantages.

In accordance with a second aspect of the invention, there is provided a scanning probe microscopy system for imaging structures on or below the surface of a sample, comprising a probe for scanning the sample surface, wherein the probe comprises a probe tip mounted on a cantilever, and wherein the probe is mounted on a sensing head arranged for bringing the probe tip in contact with the sampling surface, the system further comprising a motion actuator for enabling motion of the probe relative to the sample, a transducer for applying an acoustic input signal to the sample, and a probe deflection sensor for producing a sensor signal indicative of an acoustic output signal received via the probe tip, wherein the acoustic output signal is representative of an amount of indentation of the surface by the probe tip in response to the acoustic input signal when it is applied to the sample; wherein the transducer is arranged for producing the acoustic input signal such as to comprise a plurality of signal components that each have a unique frequency, wherein the plurality of signal components comprise: a base signal component at a carrier frequency; and a plurality of additional signal components having further excitation frequencies; wherein the carrier frequency and the further excitation frequencies together form a group of frequencies, wherein the frequencies of the group of frequencies are distributed with an equal difference frequency between each two subsequent frequencies of the group; and wherein the difference frequency is a frequency below a sensitivity threshold frequency for enabling said sensing of the acoustic output signal; and wherein the additional signal components are provided as sideband signal components such that in a frequency domain the further excitation frequencies of the sideband signal components are arranged at either side of the carrier frequency of the base signal component, wherein at least two sideband signal components are arranged at either side of the carrier frequency.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
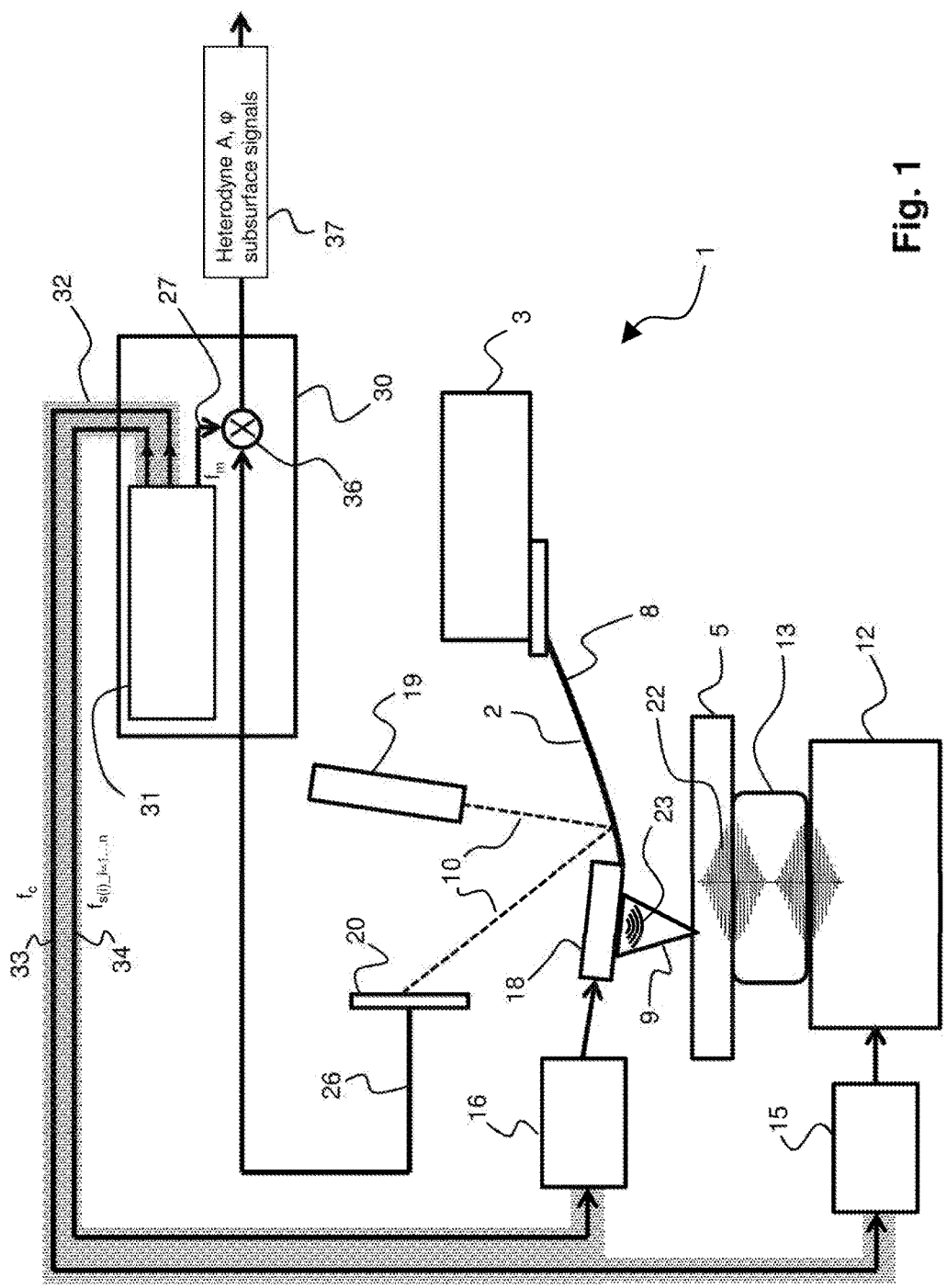
FIG. 1 schematically illustrates a system in accordance with an embodiment of the invention, for performing a method in accordance with the invention.

Scanning probe microscopy is a highly accurate method of imaging nanostructures on the surface of a sample by scanning a probe with a probe tip across the sample surface, while keeping the probe tip in contact with the surface (contact mode) or vibrating the probe tip such as to tap the probe tip in contact with the surface during each cycle of vibration (tapping mode). As a skilled person will appreciate, other sensing modes are available for performing scanning probe microscopy, which are not further discussed here but which are known to the skilled person. In regular scanning probe microscopy methods, such as atomic force microscopy, only the structures on the surface of the substrate are visualized.

In a number of fields of application of scanning probe microscopy, there is an interest in visualizing structures that are present below the surface of a substrate. For example, in the field of semiconductor device manufacturing, device layers may be covered underneath other device layers of a semiconductor device. One possible scanning probe microscopy technique, referred to as heterodyne force microscopy, provides a sensing method that allows the visualization of sub-surface structures. In heterodyne force microscopy, an acoustic signal is applied to the sample which propagates through the sample substrate and contributes to periodic indentations of the surface of the substrate by the tip. The acoustic input signal contains components at various frequencies which in the composition of the input signal aggregate into a component at their difference frequency. The frequency of the applied acoustic signals and the dimensions of the structures determine the physical principle that governs the interaction, e.g. <100 MHz acoustic signal enables characterization of subsurface features by measuring viscoelastic properties of the sample, or >1 GHz to detect subsurface structures based on subsurface scattering of the acoustic signal. This invention focuses on the detection of subsurface features based on viscoelastic properties of the sample, as a result of acoustic input signals of <200 MHz, preferably <100 MHz, frequencies.

The probe tip of the scanning probe microscopy system is scanned across the surface, and vibrations applied to the sample result in the probe tip to be pressed onto the surface such as to result in (temporary) surface indentations. This is picked up by the sensing system of the SPM to provide an output signal. The output signal is analyzed using an analysis system for providing information about any subsurface structures present underneath the surface of the sample. These vibrations that form the output signal may be picked up by means of an optical sensor, often consisting of a laser beam that impinges on the cantilever of the probe and reflects onto an optical detector. However, other techniques are available to monitor probe tip motion such as to obtain the output signal. For example, instead of an optical sensing technique, capacitive measurement of probe tip motion could be applied to obtain an output signal. The invention is not limited to one particular manner of obtaining the output signal.

The acoustic input signals that may be applied can be preselected within a wide range of frequencies, ranging from 100 kHz to 100 MHz. The invention applies heterodyne sensing to enable detection at any acoustic frequencies, e.g. applying multiple acoustic signals of 10 MHz or above but with difference frequencies between the individual signal components which are comparable to (e.g. between 80% and 120% of) the first contact resonance frequency of the probe. The output acoustic signal as a result of the sample interaction is detected by means of down-conversion of the input frequencies, and measured for the phase and amplitude characteristics. This is achieved by applying a carrier frequency, and by applying a plurality of additional signal components at one or more further excitation frequencies that are slightly different from the carrier frequency. The frequency difference, which is also referred to as modulation frequency of difference frequency, is present as a down-converted signal component at the modulation frequency in the composite acoustic input signal obtained, and responsive thereto in the output signal which can be analyzed to detect these phase and amplitude characteristics. In particular, the invention proposes to add, in the frequency domain, multiple additional signal components (not just one) on either side of the carrier frequency. The excitation frequencies of these additional signal components each are distributed at equidistant intervals in the frequency domain, separated by the modulation frequency. The multiple signal components, together with the base signal, in the output signal downmix into the modulation frequency, which is within sensitivity range of the sensing system. This output signal conveys the information on subsurface structures.

In accordance with the invention, the application of at least two additional signals having excitation frequencies that in the frequency domain are mutually separated by a difference frequency or modulation frequency that is comparable to (e.g. within 80% and 120% of) the contact resonance frequency of the probe, enables to shape the envelope of the input signal such as to concentrate energy into periodic bursts at the modulation signal, providing a better SNR in the output signal. For example, the input signal could include four or six additional signal components in addition to the carrier frequency, wherein each two subsequent components are separated by a same difference frequency. This causes the signal components to aggregate into a single high power signal burst per repetition period in the input signal. For example, within one periodic cycle with duration T=1/f at the modulation frequency f, the interacting signal components may be applied to constructively aggregate into one narrow burst of high signal power and one or more bursts of much smaller signal power during that cycle. The one repetitive high signal power burst at the modulation frequency provides a much better SNR than achievable with conventional heterodyne subsurface AFM methods.

FIG. 1 schematically illustrates a scanning probe microscopy system 1 in accordance with an embodiment, configured for use in a method in accordance with an embodiment of the invention. In the system 1, a probe 2 is attached to a scan head 3. The scan head 3 enables scanning of the probe 2 relative to the surface of a sample 5. The probe 2 consists of a cantilever 8 and a probe tip 9. During scanning, the probe tip 9 is brought in contact with the surface of the sample 5. For example the probe tip 9 may be scanned across the surface of the sample 5 in contact mode (continuous contact between the probe tip 9 and the surface of the sample 5). A laser unit 19 provides a laser beam 10 that impinges on the cantilever 8 and reflects towards an optical detector 20. Using the optical detector 20, vibrations in the cantilever 8 can be sensed due to small deflections of the reflected beam 10 under influence of such vibrations. This provides an output signal 26 for further analysis.

In accordance with the present invention, a generator 31 generates an input signal 32 for applying an acoustic input signal to the sample. The input signal 32 at least consists of a first part 33 and a second part 34. The first part 33 provides the carrier wave or base signal component which is periodic with a frequency $f_c$. The second part 34 provides two or more additional signal components that are periodic with frequencies $f_{s(i)}$, wherein i is an index integer ranging from 2 to n (with $n \in N$). The frequencies $f_c$ and $f_{s(i)}$ are at least larger than the sixth contact resonance mode frequency of the cantilever 8 interacting with the sample 5. These frequencies $f_c$ and $f_{s(i)}$ may be for example within a range of 100 kilohertz (kHz) to 100 megahertz (MHz) for performing surface elasticity based subsurface sensing. Characteristic for the frequencies $f_c$ and $f_{s(i)}$ of the input signal parts 33 and 34 is that the difference between each two subsequent frequencies $f_{s(i)}$ or $f_c$, the difference frequency or modulation frequency $f_m$, is smaller than or equal to the first contact resonance frequency $f_0$ of the cantilever 8.

Figure 5:
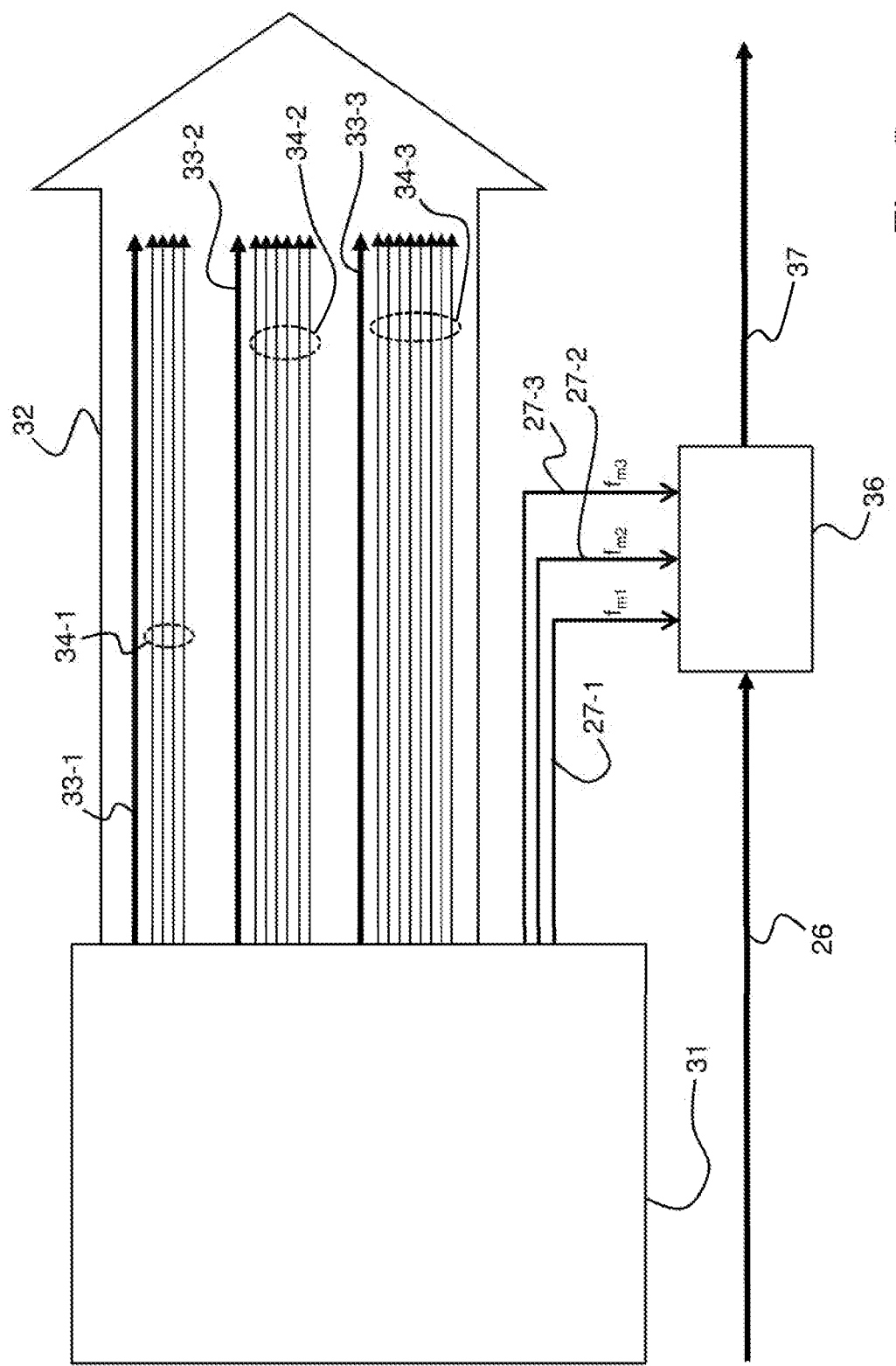
FIG. 5 schematically illustrates how an input signal in a system and method of the invention is composed and generated.

In some embodiments, the input signal 32 may consist of a base signal component 33 at the carrier frequency $f_c$ and a plurality of additional signal components 34 at unique frequencies $f_{s(i)}$. In the example illustrated in FIG. 1, these are separated into a first part 33 and second part 34 to enable to apply both parts to different parts of the system, e.g. the sample via transducer 12 and the cantilever via transducer 18. For example, four additional signal components $f_{s(1)}$, $f_{s(2)}$, $f_{s(3)}$ and $f_{s(4)}$ may be added to the carrier frequency L, wherein two of the additional signal components are on each side of the carrier frequency L in the frequency domain. However, in some embodiments, the input signal 32 may include multiple base signal components at different carrier frequencies and multiple additional signal components associated with each carrier frequency. Each carrier frequency with its associated additional input components forms a group of frequencies within the input signal 32. For example, FIG. 5 illustrates an input signal 32 including three groups of frequencies. A first group of frequencies is provided by the base signal component 33-1 and four additional signal components 34-1. A second group of frequencies is provided by the base signal component 33-2 and six additional signal components 34-2; and a third group of frequencies is provided by the base signal component 33-3 and eight additional signal components 34-3. All frequencies in all groups 33-1 to 33-3 and 34-1 to 34-3 are different. The carrier frequencies of the first, second and third group respectively are at $f_{c1}$, $f_{c2}$ and $f_{c3}$. The frequency differences between each two subsequent frequencies within each group are equal, e.g. $f_{m1}$, $f_{m2}$ and $f_{m3}$ respectively for the first, second and third group. In a preferred embodiment, the modulation frequencies $f_{m1}$, $f_{m2}$ and $f_{m3}$ are equal as well. However, in some embodiments, different modulation frequencies $f_{m1}$, $f_{m2}$ and $f_{m3}$ may be applied for each group. As will be explained further down below, the modulation frequencies $f_{m1}$, $f_{m2}$ and $f_{m3}$ will be used by filter 36 to selectively analyze the output signal.

Back to FIG. 1, in accordance with the present invention, both the first input signal part 33 and the second input signal part 34 are converted into an acoustic signal to be applied during scanning. In the embodiment of FIG. 1, a transducer unit 18 is in contact with a probe tip 9, and receives the input signal part 33 including the base signal component that is amplified using power amplifier 16. The transducer 18 converts the input signal part 33 to an acoustic signal 23 applied to the probe tip 9. Moreover, the second input signal part 34 is amplified in power amplifier 15 and provided to transducer 12 underneath the sample 5. A coupling medium 13 (e.g. wax) provides for acoustic coupling between the transducer 12 and the sample 5. The second input signal part 34 amplified using power amplifier 15 is converted into an acoustic signal 22 to be applied via the coupling medium 13 to the sample 5. The both acoustic signals 22 and 23 will result in a mixed signal applied as input signal to the sample 5. The mixed signal comprises all frequency components $f_c$ and $f_{s(i)}$, the sum frequencies $f_{high\_1}=f_c+f_{s(1)}$, $f_{high\_2}=f_c+f_{s(2)}$, $f_{high\_3}=f_c+f_{s(3)}$, . . . $f_{high\_n}=f_c+f_{s(n)}$, and each differential frequency $f_{diff}=|f_c-f_{s(1)}|=|f_{s(2)}-f_{s(1)}|$ . . . $=|f_{s(n)}-f_{s(n-1)}|$. Responsive to the applied acoustic input signal, the probe tip 9 of the probe 2 is pressed into and out of the surface of sample 5, thereby indenting the surface. These indentations can be measured by monitoring the output signal 26. Hence, the output signal 26 also includes a signal at the modulation frequency $f_m$, which will be used to perform the subsurface measurement in accordance with the invention. The differential frequency or modulation frequency $f_m$ is lower than the first contact resonance frequency. Therefore, this will provide a frequency component $f_m$ having a frequency that can be sensed via the cantilever 8. As will be appreciated, this differential frequency or modulation frequency $f_m$ must be in a range that is within a cut-off frequency range (e.g. below a cut-off frequency, or within a frequency band around a certain frequency) that is characteristic for the cantilever to be picked up via the cantilever as is illustrated in FIG. 1. If multiple different modulation frequencies $f_{m1}$ to $f_{m3}$ are present in the input signal, they must all be comparable to the first contact resonance frequency $f_0$ (e.g. within the range $0.8*f_0 < f_{m1}, f_{m2}, f_{m3}, < 1.2*f_0$) or close to other contact frequency modes.

Any information on sub-surface structures may be obtained from the output signal 26 that is obtained by the probe 2 in response to the acoustic input signal 22. By mixing the two acoustic signals 22 and 23, this information may also be obtained from the signal component of the output signal 26 at the modulation frequency $f_m$. Therefore, the output signal 26 contains the information on sub-surface structures. This output signal 26 is provided to the analysis system 30. In the analysis system 30, the output signal 26 is compared with a reference signal 27 that at least include the (or all) modulation frequency $f_m$. The reference signal 27 is created by analyzing the first and second input signal parts 33 and 34 e.g. by digital analysis for determining their difference frequency, and generating the reference signal having a frequency component $f_m$. The comparison between reference 27 and output signal 26 from optical detector 20 is represented by filter element 36 in FIG. 1, and at the output of the analysis system 30, there is provided a filtered output signal 37 comprising the amplitude A(x, y) and phase φ(x, y) of the output signal 26 measured at the frequency $f_m$. By mapping these location dependent amplitude and phase signals, sub-surface structures may be visualized in accordance with the present invention.

Figure 2:
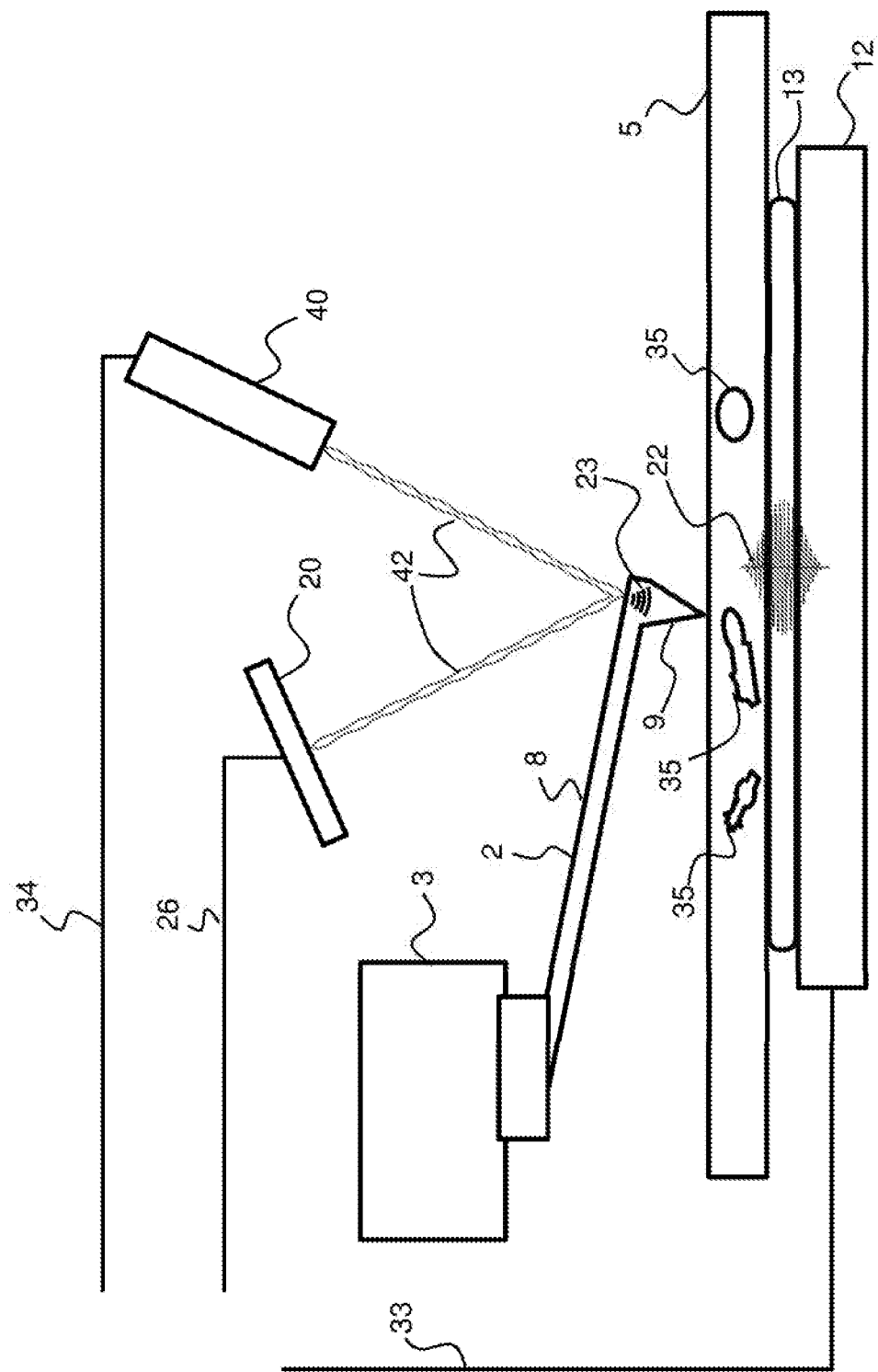
FIG. 2 schematically illustrates a system in accordance with an embodiment of the invention, for performing a method in accordance with the invention.

The acoustic signals may be applied using various different methods. In the embodiment of FIG. 2, the acoustic signal 23 is applied via the probe tip 9, whereas the acoustic signal 22 is applied via the transducer 12 and coupling medium 13 to the sample 5. FIG. 2 also illustrates sub-surface structures 35 (which may of course be of any arbitrary shape, structure, material, or size). In the embodiment of FIG. 2, the second input signal part 34 is provided to a modulated laser source 40. The modulated laser source 40 provides an intensity varied laser beam 42. The modulation of the laser beam 42 has a frequency spectrum identical to the input signal part 32. Due to the modulation in the laser beam 42, a variable amount of heat is provided to the probe tip 9 continuously, resulting in acoustic vibrations inside the probe tip 9. The acoustic vibrations provide for the acoustic input signal 23 illustrated in FIG. 2. Using the pulsed laser beam 42 enables to generate the acoustic input signal 23 while at the same time allowing detection of the pulsed laser beam 42 at the optical detector 20 such as to obtain the output signal 26 indicative of cantilever or probe tip vibrations. This therefore obviates the need for an additional transducer or other means for applying the acoustic signal 23 for either the probe tip 9 or sample 5. As may be appreciated, although combining the excitation beam for providing the acoustic input signal 23 with the optical sensing beam for determining probe deflection does provide advantages in terms of only requiring one beam for actuation and sensing, this is not required. The skilled person will appreciate that there may be a separate excitation beam and a separate sensing beam, and will also appreciate that the cantilever's geometry and the position of incidence of the excitation laser beam on the cantilever need to be optimal in order to generate the desired tip motion.

In addition to the above, it is observed that it is not essential to apply an optical sensing technique to determining probe deflection. In fact any suitable type of probe deflection sensor may be applied. Alternative sensing techniques for example include the application of a piezo-resistive layer on the cantilever, the electrical resistance of which vary with probe deflection. Probe deflection may in that case be detected by detecting voltage differences in an electric signal applied to the piezo-resistive layer. As another alternative, probe deflection may be detected using a piezo-electric element or layer, the potential of which changes dependent on cantilever motion. Alternatively, capacitive measurements may be applied in an electrostatic sensing technique. As some further alternatives, one may also apply an interferometer to measure probe deflection or perform a heat flux measurement in a thermal method by using a temperature difference between probe and sample. The skilled person will be familiar with such techniques and is able to apply them in embodiments of the present invention.

Figure 3:
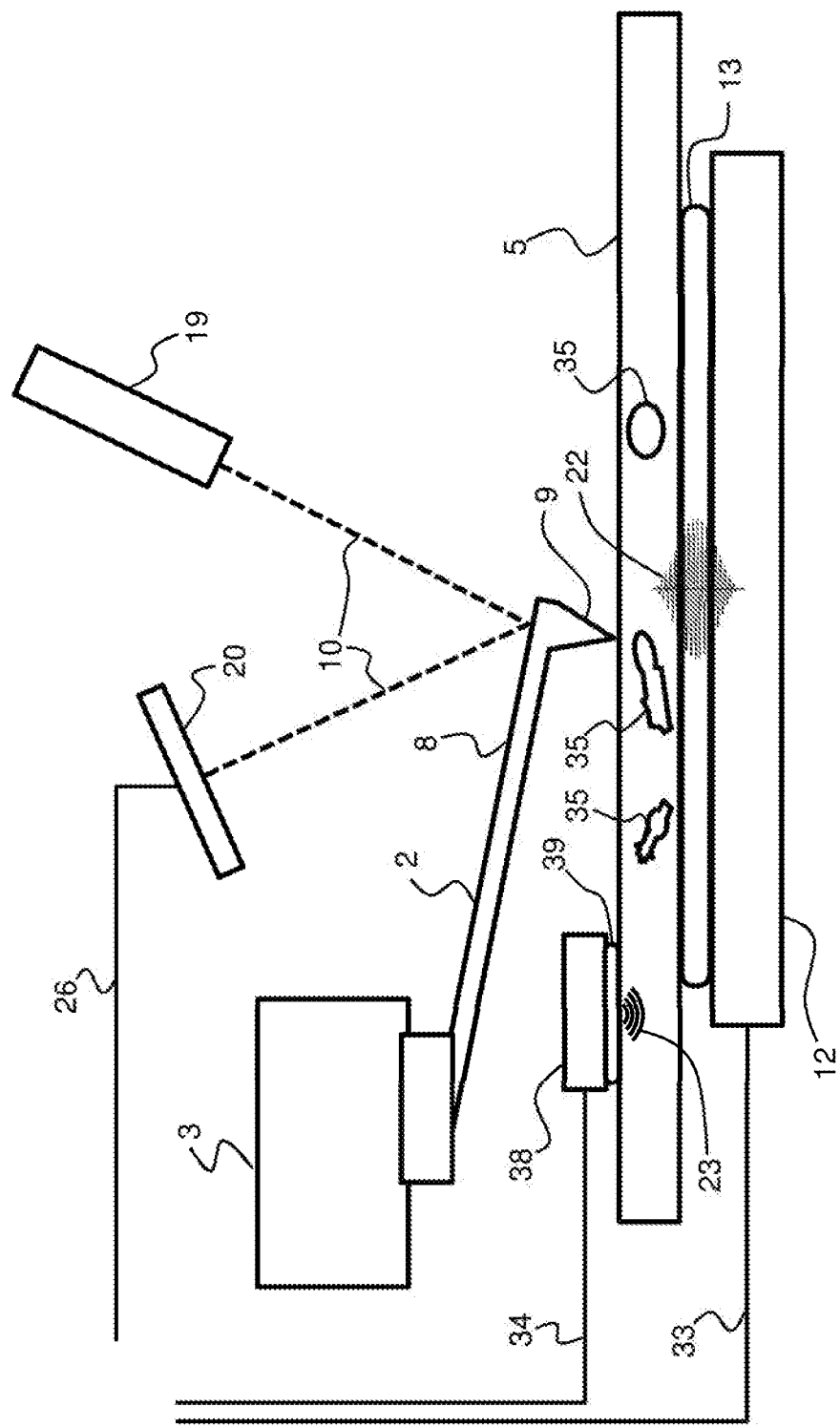
FIG. 3 schematically illustrates a system in accordance with an embodiment of the invention, for performing a method in accordance with the invention.

Yet a further embodiment of the present invention is illustrated in FIG. 3. In the embodiment of FIG. 3, the input signal 23 is applied via a transducer 38 and an additional coupling medium 39 directly to the sample 5. In the embodiment of FIG. 3, application of the input signal 23 is via the transducer 38 from above (i.e. the surface of the sample 5), but the skilled person may appreciate that the acoustic input signal 23 may also be applied from the side of the sample 5 or from underneath the sample 5. Although application of the acoustic input signal 23 via the probe tip 9 in the first and second embodiments of FIGS. 1 and 2 respectively has the advantage that coupling losses for applying the acoustic signal 23 and losses in sensing the signal via the probe tip 9 are reduced to a minimum, the embodiment of FIG. 3 illustrates that it is not an absolute requirement to apply the acoustic input signal 23 via the probe tip. The embodiments of FIGS. 1 and 2, by mixing the components in the probe 2, are less prone to these losses. However, with the method of the present invention, the signal envelope of the beat signal concentrates aggregation of the various signal parts in short high power signal bursts. These bursts are sufficiently strong to overcome the disadvantageous effects of the deteriorated coupling and higher signal losses in the embodiment of FIG. 3. Hence, as a further advantage, the present invention renders the embodiment of FIG. 3 to be better configured for subsurface sensing by heterodyne force microscopy. Furthermore, the embodiment illustrated in FIG. 3 provides the advantage that the detected optical beam 10 does not comprise a pulsation (as in the embodiment of FIG. 2) within the bandwidth of the optical motion measurement system, that may need to be filtered out with a low pass filter. Also, the embodiment of FIG. 3 is more cost efficient by not applying a pulsed laser source. Signal losses due to deteriorated coupling are less of an issue at lower carrier frequencies, and therefore this problem plays an insignificant role at acoustic frequencies that are used to perform surface elasticity based subsurface measurements.

Figure 4:
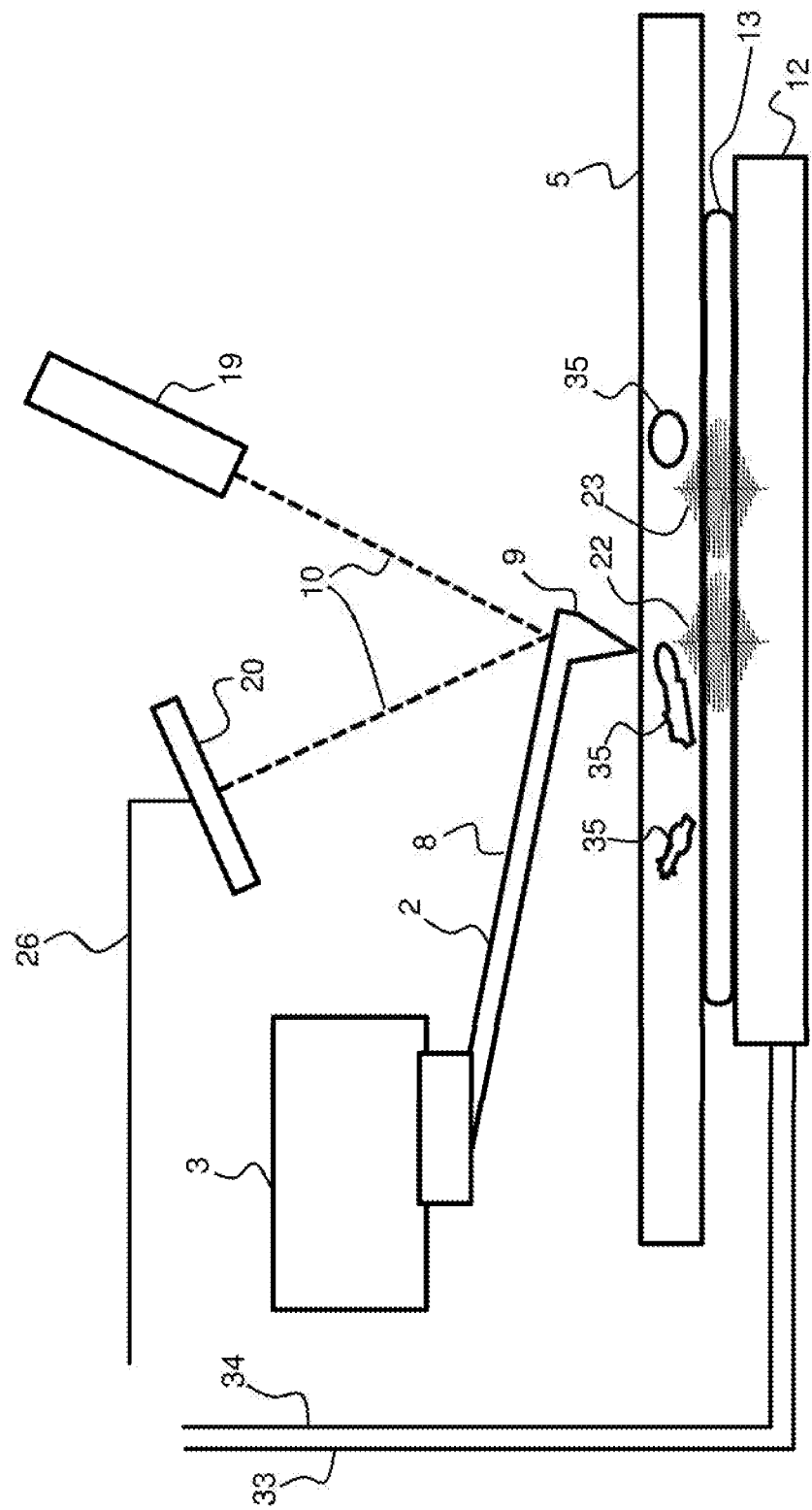
FIG. 4 schematically illustrates a system in accordance with an embodiment of the invention, for performing a method in accordance with the invention.

In yet another embodiment, which is illustrated in FIG. 4, both acoustic input signals 22 and 23 are applied via the transducer 12 underneath the sample 5. Here, the both input signal parts 33 and 34 are provided to the transducer 12 as is schematically illustrated in FIG. 4. Like in FIG. 3, the created indentations by the probe tip 9 at the surface of sample 5 may be picked up via the sensing system, providing an output signal 26 obtained via the optical detector 20. The embodiment of FIG. 4 has the further advantage of not requiring any further transducers other than the transducer 12 underneath the sample 5.

Figure 9:
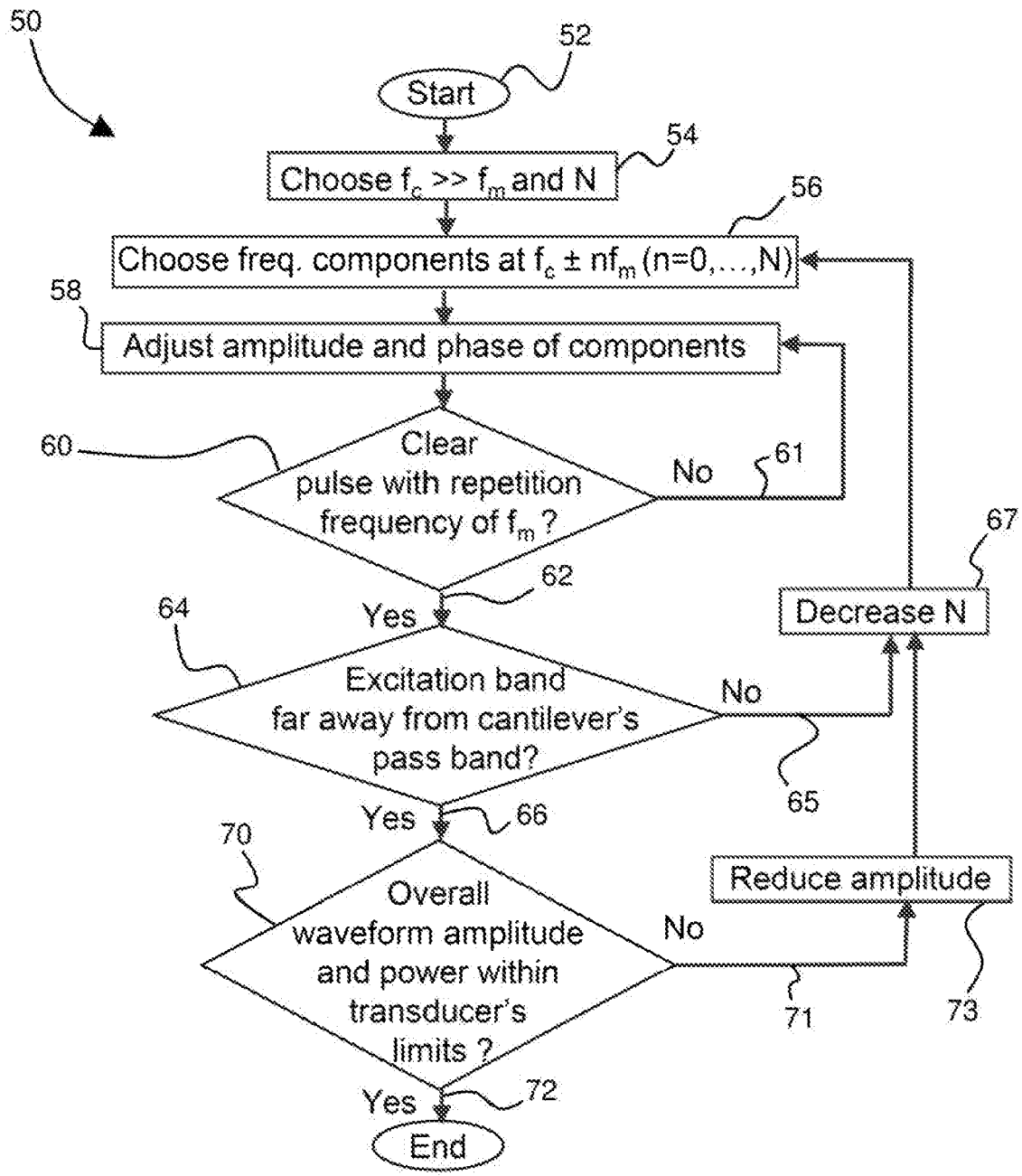
FIG. 9 illustrates the tuning of the input signal in a method in accordance with an embodiment of the invention.

FIG. 9 schematically illustrates a method of the present invention, in accordance with an embodiment thereof. The method is applied using a system in accordance with the invention, such as any of the embodiments described above. The method of FIG. 9 is directed at preselecting and tuning the signal characteristics of the various signal components and applying these to the sample such as to perform subsurface sensing using a scanning probe microscopy system. The method starts in 52. In step 54, a carrier frequency $f_c$ (or multiple carrier frequencies) are selected, as well as a desired modulation frequency $f_m$. The modulation frequency $f_m$, as explained, will define the intervals in the frequency domain between each two subsequent frequencies of the various signal components (the additional signal components and the base signal component). Also, a starting value for the number N of additional signal components 34 to be added to the base signal component 33 may be preselected in step 54. Next, in step 56 and based on the values preselected in step 54, the frequency $f_{s(i)}$ of each additional signal component is preset by using the carrier frequency as base and adding or subtracting a multiple times the modulation frequency. This multiple is dependent on the order of the additional signal, wherein the term 'order' is indicative of how many frequencies are in between the respective additional signal component and the carrier frequency. Thus, the first order additional signal is the additional signal which is in the frequency domain directly adjacent to the carrier frequency without any other additional signal components in between; hence the first order additional signal components have a frequency of $f_{s(i)}=f_c\pm1*f_m$. The second order additional signal components are those having one single other additional signal component in between the carrier frequency $f_c$ and the frequency $f_{s(i)}$ of the respective additional signal component. Thus, the second order additional signal components have a frequency of $f_{s(i)}=f_c\pm2*f_m$. Likewise, the third order additional signal components (if present) have a frequency of $f_{s(i)}=f_c\pm3*f_m$, the fourth order additional signal components (if present) have a frequency of $f_{s(i)}=f_{s(i)}=f_c\pm4*f_m$, the fifth order additional signal components (if present) have a frequency of $f_{s(i)}=f_c\pm5*f_m$, the sixth order additional signal components (if present) have a frequency of $f_{s(i)}=f_c\pm6*f_m$, and so on.

In step 58, the phase and amplitude of the various signals may be tuned or preset. Then, in step 60 it is determined if the present amplitude and phase values provide for clear pulses or bursts having a repetition frequency at the modulation frequency $f_m$. If this is not the case, in accordance with 61, the method goes back to step 58; otherwise the method will continue (see arrow 62). In step 64 it is determined whether the excitation band (the range of applied acoustic frequencies) is sufficiently far from the cantilever's pass band (i.e. mainly the sensitivity range of the cantilever). The cantilever is sensitive at least at frequencies near the first contact resonance frequency, and may likewise be responsive with diminishing sensitivity up to the fifth or sixth contact resonance mode frequency. The measurability of the output signal 26, however, is also determined by the sensitivity of the sensing unit 20 that monitors the probe tip position. Thus the modulation frequency must be such that both the sensitivity constraints of the sensing unit 20 and the probe 2 are met. If in step 64 it is determined that the excitation band is not adequately far from the sensitivity range of the system, then in accordance with 65 the number N of additional signal components is decreased in step 67 and the method goes back to step 56; otherwise the method will continue (see arrow 66). In step 70 it is determined whether the overall waveform amplitude and power are within the limits of the transducers of the system (e.g. transducers 12 and 18). If this is not the case, in accordance with 71, the amplitude will be reduced in step 73, the number N of additional signal components on each side of the carrier frequency is decreased in step 67 and the method goes back to step 56; otherwise the method will continue (see arrow 72). Thereafter, the tuning ends (as indicated in FIG. 9), however the system is ready for performing the measurements on the sample 5. Hence, the application of the acoustic signal and taking of measurements via the probe may continue to perform the measurement and characterization of subsurface features.

Figure 6A:
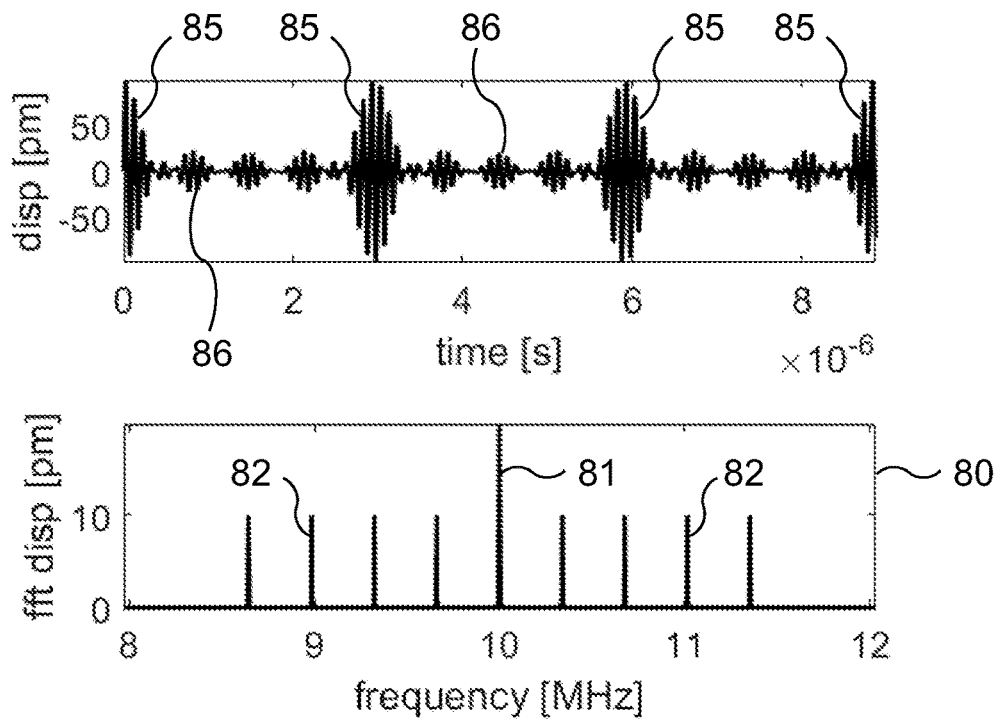
FIGS. 6a to 6d illustrate the generating of input signals in a method in accordance with several embodiments of the invention.

FIGS. 6a to 6d provide simulations of particular input signals created using a method of the invention and consisting of input signal components, including one or more base signal components and associated additional signal components. The input signal components are each illustrated in the frequency domain, whereas the composite input signals are illustrated in the time domain. In FIG. 6a, the base signal component comprises carrier wave 81 at a carrier frequency $f_c$ of 10 MHz. On either side of the carrier wave 81, a plurality of additional input signals 82 is added, each being at a different excitation frequency fso). The modulation frequency $f_m$ is at 0.333 MHz. The additional input signals 82 are provided as sideband frequencies to the carrier frequency fe, and may sometimes be referred to as sideband signals. As explained above, the first order additional signal components are at 9.667 MHz and 10.333 MHz, the second order additional signal components are at 9.333 MHz and 10.666 MHz, the third order additional signal components are at 9.000 MHz and 11.000 MHz, and the fourth order additional signal components are at 8.667 MHz and 11.333 MHz. The amplitudes $A_{s(i)}$ of the additional signal components are selected to be half the amplitude $A_0$ of the base signal component, thus for all i: $A_{s(i)}=A_0*0.5$. The input signal in FIG. 6a as visualized in the time domain, shows a beat signal with one high power burst 85 at a repetition frequency of $f_m=0.333$ MHz (one burst every $3*10^{-6}$ seconds) and three smaller bursts 86 in between the high power bursts 85.

Figure 6B:
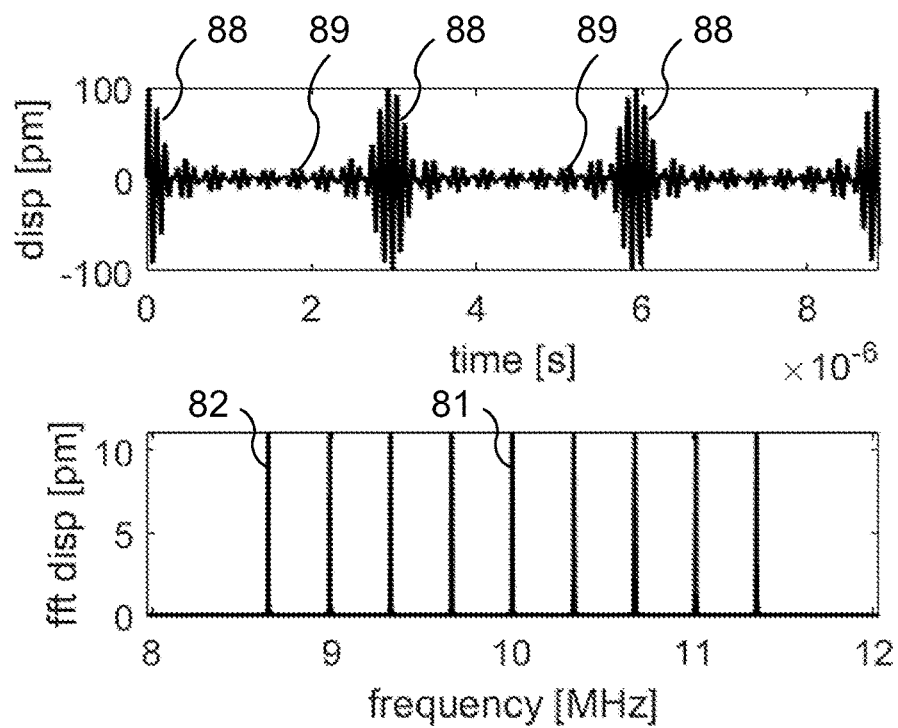

In FIG. 6b, the amplitudes of all additional signal components 82 are the same as the amplitude for the base signal component 81, thus $A_{s(i)}=A_0$ for all i. The other parameters and characteristics are kept the same as in the example of FIG. 6a. As can be seen, this changes the shape of the envelope of the input signal considerably. In the upper graph of FIG. 6b, which illustrates the input signal in the time domain, a high power signal burst 88 is still present in the beat signal at a repetition frequency of $f_m=0.333$ MHz (one burst every $3*10^{-6}$ seconds). However, the amplitude of the high power signal bursts 88 are higher. The smaller bursts 89 in between each two bursts 88 are higher in number and smaller in amplitude.

Figure 6C:
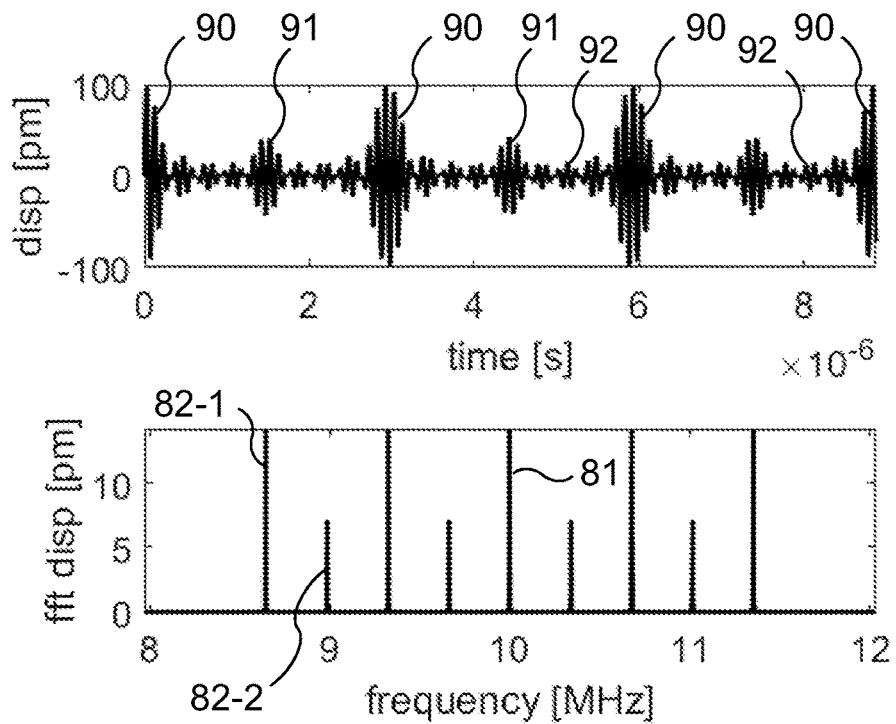

In FIG. 6c, the input signal comprises a base signal component 81 and on each side thereof four additional signal components 82 (i.e. only two of these have been designated a reference numeral: 82-1 and 82-2 (not referring to the order defined above, but to the index value i, i.e. 82-i)). Alternatingly, in the frequency domain in order of increasing frequency, the additional signal components 82 have an amplitude that is either equal to that of the carrier wave 81 or half of that of the carrier wave 81. For example, additional signal component 82-1 has amplitude $A_{s(1)}=A_0$, whereas additional signal component 82-2 has amplitude $A_{s(2)}=A_0$. Going from the carrier frequency $f_c$ outward, on either side thereof, the first order additional signal components 82 have an amplitude $A_{s(4)}$ and $A_{s(5)}$ of half that of the carrier wave 81, the second order additional signal components 82 have an amplitude $A_{s(3)}$ and $A_{s(6)}$ that is equal to that of the carrier wave 81, the third order additional signal components 82 have an amplitude $A_{s(2)}$ and $A_{s(7)}$ that is half of that of the carrier wave 81, and the fourth order additional signal components 82 have an amplitude $A_{s(1)}$ and $A_{s(8)}$ that is equal to that of the carrier wave 81. Now, the input signal as illustrated in the time domain in the upper part of FIG. 6c shows the high power bursts 90 at a repetition frequency equal to the modulation frequency $f_m$, and halfway in between the bursts 90 there are moderate power bursts 91 at a same repetition frequency $f_m$. In between the high power bursts 90 and the moderate power bursts 91, there are low power pulses 92.

Figure 6D:
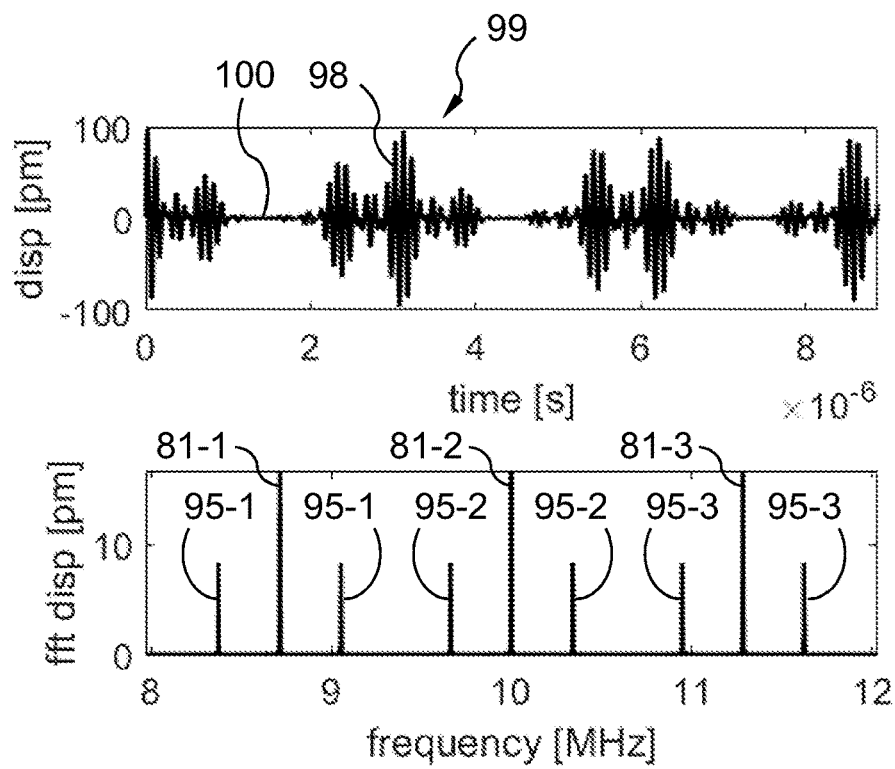

In the example depicted in FIG. 6d, the input signal consists of three groups of frequencies. A first group is formed by base signal component 81-1 at carrier frequency $f_{c1}$, and additional signal components 95-1 on either side thereof. A second group is formed by base signal component 81-2 at carrier frequency $f_{c2}$, and additional signal components 95-2 on either side thereof. A third group is formed by base signal component 81-3 at carrier frequency $f_{c3}$, and additional signal components 95-3 on either side thereof. The modulation frequency $f_m$ is 0.333 MHz for all groups. The carrier frequencies are $f_{c1}=8.667$ MHz, $f_{c2}=10.000$ MHz and $f_{c3}=11.333$ MHz. For all additional signal components 95-1 to 95-3, the amplitudes $A_{s(i)}$ is half that of the carrier waves $A_0$, and $A_0$ is equal for all carrier waves 81-1 to 81-3. The time domain input signal 99 shows a bursty signal pattern of two or more aggregated beats. The high power peaks 98 are more or less at the repetition frequency $f_m=0.333$ MHz. In between the active signal parts, there are silent parts 100.

Figure 7A:
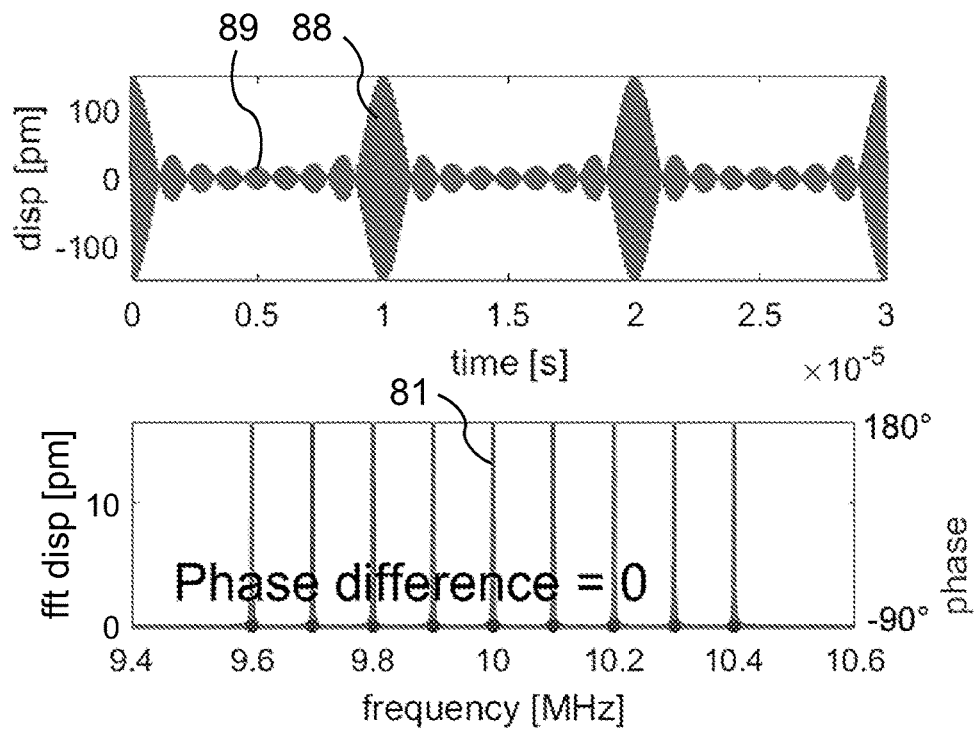
FIGS. 7a and 7b illustrate the generating of input signals in a method in accordance with several embodiments of the invention.
Figure 7B:
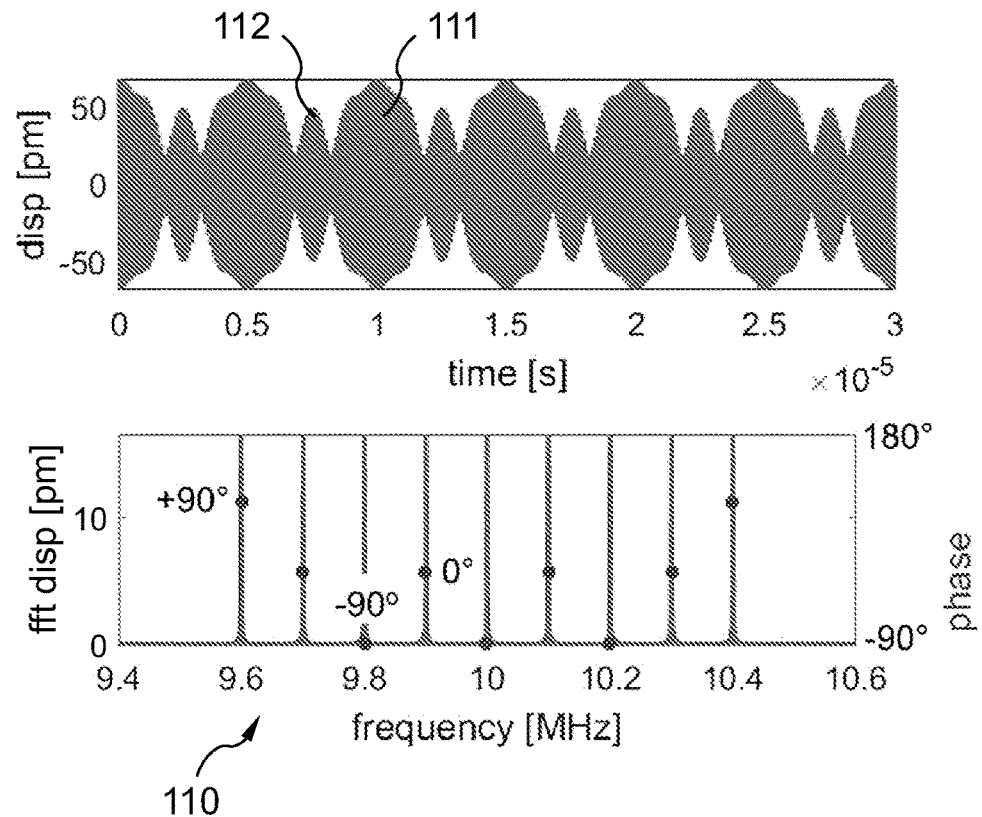

From the above FIGS. 6a to 6d, it follows that the envelope of input signal may be shaped dependent on the characteristics of its signal components in the frequency domain. In particular dependent on e.g. the amplitudes of the various signal components and how these relate to the amplitude $A_0$ of the carrier wave. Also the forming of frequency groups may be used to 'shape' the acoustic input signal and locally concentrate the signal power in some of the bursts to obtain a high SNR in the output signal. In addition to this, the phase of the various signal components may be varied to shape the input signal as desired. This is illustrated in the examples of FIGS. 7a and 7b. The situation in FIG. 7a is identical to the situation illustrated for FIG. 6b: the amplitudes of all additional signal components 82 are the same as the amplitude for the base signal component 81, thus $A_{s(i)}=A_0$ for all i. The base signal component comprises carrier wave 81 at a carrier frequency $f_c$ of 10.0 MHz, and the modulation frequency $f_m$ is 0.1 MHz. In FIG. 7a, the phases of all signal components (including the base signal component 81) is equal: $-90°$ or $-\pi/2$ radians. The time domain signal is identical to the situation in FIG. 6b, although the repetition frequency is different because the modulation frequency $f_m$ is 0.1 MHz—high power bursts 88 occur every 10 μs (microseconds), with seven small pulses 89 in between the high power bursts 88.

In FIG. 7b, graph 110 in the frequency domain, the phases of the input signal components is varied relative to the phase of the carrier signal. The base signal component (carrier signal) still has a phase of $\pi/2$ radians)($-90°$). The first order additional signal components are at a phase of 0 radians) (0°), the second order additional signal components are at a phase of $-\pi/2$ radians)($-90°$), the third order additional signal components are at a phase of 0 radians)(0°), and the fourth order additional signal components are at a phase of $+\pi/2$ radians)(+90°). The resulting time domain input signals in the upper part of the figure are of a complete different shape in comparison to the time domain input signal in FIG. 7a. The high power peaks 111 are much broader, but less high. In between, relatively high moderate peaks 112 are visible. The overall RMS amplitude, however, is the same as in FIG. 7a. Thus, the signal is more spread in time, forming a broad but lower burst signal.

Figure 8:
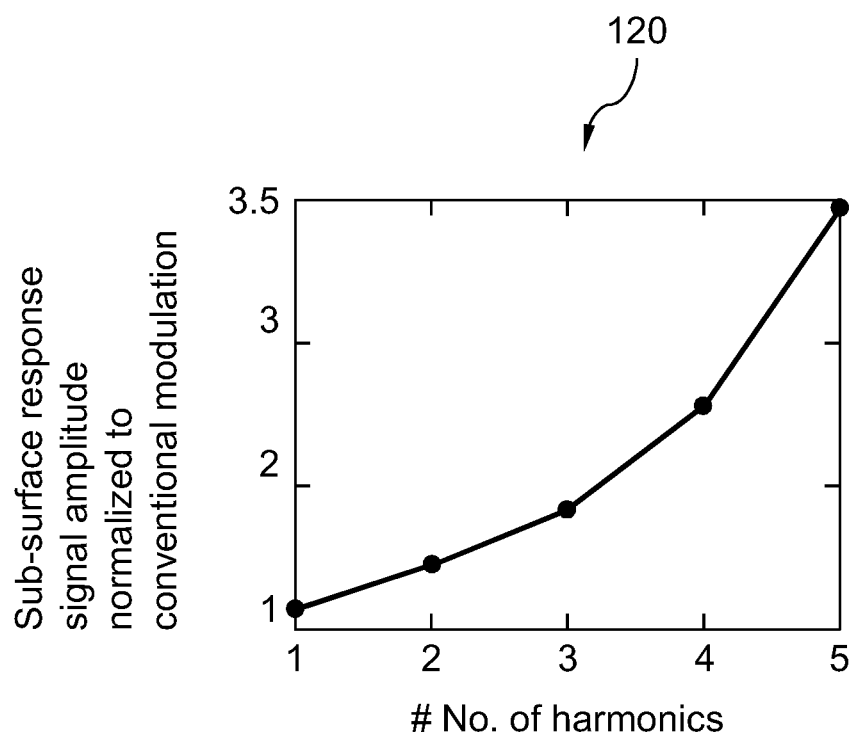
FIG. 8 illustrates the increase in the amplitude of the output signal as dependent on the number of harmonics of a modulation frequency as additional signal components to a carrier wave in an input signal obtained in accordance with the invention.

In FIG. 8, for a standard signal such as e.g. the example in FIG. 6a, the subsurface response signal amplitude is depicted normalized with respect to a conventional modulation input signal in heterodyne subsurface AFM. Clearly, adding harmonics as additional signal components to the input signal may be applied to burst up the input signal in the time domain and provide an excellent SNR in the output response. If five harmonics are added (hence the total input signal consisting of eleven signal components (including the carrier wave)), the amplitude of the output signal is 3.5 times as large as compared to that with a conventional modulation input.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A heterodyne scanning probe microscopy method for imaging structures below a surface of a sample, the method including:
   applying, using a transducer, an acoustic input signal to the sample;
   sensing an acoustic output signal using a probe, the probe including a cantilever and a probe tip, wherein the probe tip is in contact with the surface, wherein the acoustic output signal is representative of an amount of indentation of the surface by the probe tip in response to the acoustic input signal applied to the sample;
   wherein the acoustic input signal comprises a plurality of signal components that each have a unique frequency,
   wherein the plurality of signal components comprise:
   a base signal component at a carrier frequency; and
   a plurality of additional signal components having further excitation frequencies;
   wherein the carrier frequency and the further excitation frequencies together form a group of frequencies, wherein frequencies of the group of frequencies are distributed with an equal difference frequency between each two subsequent frequencies of the group of frequencies;
   wherein the equal difference frequency is a frequency below a sensitivity threshold frequency for enabling said sensing the acoustic output signal;
   wherein the plurality of additional signal components are provided as sideband signal components such that in a frequency domain the further excitation frequencies of the sideband signal components are arranged at either side of the carrier frequency of the base signal component, and
   wherein at least two sideband signal components are arranged at either side of the carrier frequency.

2. The heterodyne scanning probe microscopy method according to claim 1, wherein the carrier frequency is a frequency of at least five times a contact resonance frequency of the cantilever.

3. The heterodyne scanning probe microscopy method according to claim 1, further comprising:
   preselecting, for at least one of the additional signal components or the base signal component, at least one of a signal component amplitude or a signal component phase associated with the respective at least one signal component; and
   providing each signal component having the predetermined signal component amplitude or signal component phase associated therewith, so as to obtain the acoustic input signal having a desired envelope.

4. The heterodyne scanning probe microscopy method according to claim 3, wherein the preselecting of the at least one of the signal component amplitude or phase is performed so as to improve at least one envelope parameter to obtain the acoustic input signal having the desired envelope,
   wherein the at least one envelope parameter is a type taken from the group of parameter types consisting of: a pulse repetition frequency, a temporal distribution of amplitude within the envelope; a temporal distribution of power within the envelope; an overall peak amplitude; and a root means square amplitude.

5. The heterodyne scanning probe microscopy method according to claim 1, wherein the base signal component has an amplitude $A_0$,
   wherein each of the additional signal components has an amplitude $A_i=\alpha_i*A_0$, and
   wherein $0\leq\alpha_i\leq10$.

6. The heterodyne scanning probe microscopy method according to claim 1, wherein the sensitivity threshold frequency is smaller than or equal to a sixth contact resonant mode frequency of the cantilever.

7. The heterodyne scanning probe microscopy method according claim 1, wherein an equal number of sideband signal components having their further excitation frequencies below and above the carrier frequency is provided.

8. The heterodyne scanning probe microscopy method according to claim 1, wherein the signal components include:
   two or more base signal components having different respective carrier frequencies; and
   a plurality of additional signal components at further excitation frequencies, the plurality of additional signal components being associated with each base signal component;
   wherein the carrier frequency and the further excitation frequencies of each base signal component and associated additional signal components of the base signal component, together form a group of frequencies associated with the respective base signal component, so as to form two or more groups of frequencies,
   wherein the frequencies of each group of frequencies are distributed with an equal group difference frequency between each two subsequent frequencies of the group of frequencies, and wherein the group difference frequency is a frequency below the sensitivity threshold frequency.

9. The heterodyne scanning probe microscopy method according to claim 8, wherein one or more conditions are met from the group consisting of:
   the group difference frequencies of the two or more groups of frequencies are equal;

a difference between respective carrier frequencies of the two or more base signal components is a positive integer multiple times the group difference frequency of at least one of the groups of frequencies; and wherein the group difference frequencies of the two or more groups of frequencies are different.

10. The heterodyne scanning probe microscopy method according to claim 1, wherein the transducer is arranged for producing the acoustic input signal such that:

the carrier frequency is a frequency within a range of 5 MHz to 200 MHz.

11. A scanning probe microscopy system for imaging structures on or below the surface of a sample, comprising a probe for scanning the sample surface, wherein the probe comprises a probe tip mounted on a cantilever, and wherein the probe is mounted on a sensing head arranged for bringing the probe tip in contact with the sampling surface, the system further comprising a motion actuator for enabling motion of the probe relative to the sample, a transducer for applying an acoustic input signal to the sample, and a probe deflection sensor for producing a sensor signal indicative of an acoustic output signal received via the probe tip, wherein the acoustic output signal is representative of an amount of indentation of the surface by the probe tip in response to the acoustic input signal when it is in use applied to the sample;

wherein the transducer is arranged for producing the acoustic input signal such as to comprise a plurality of signal components that each have a unique frequency, wherein the plurality of signal components comprise:

a base signal component at a carrier frequency; and a plurality of additional signal components having further excitation frequencies;

wherein the carrier frequency and the further excitation frequencies together form a group of frequencies, wherein the frequencies of the group of frequencies are distributed with an equal difference frequency between each two subsequent frequencies of the group of frequencies; and wherein the equal difference frequency is a frequency below a sensitivity threshold frequency for enabling said sensing of the acoustic output signal;

wherein the plurality of additional signal components are provided as sideband signal components such that in a frequency domain the further excitation frequencies of the sideband signal components are arranged at either side of the carrier frequency of the base signal component, and wherein at least two sideband signal components are arranged at either side of the carrier frequency.

12. The scanning probe microscopy system according to claim 11, wherein the transducer is arranged for producing the acoustic input signal such that:

the carrier frequency is a frequency of at least five times a contact resonance frequency of the cantilever.

13. The scanning probe microscopy system according to claim 11, wherein the system is further configured for enabling preselecting, for at least one of the additional signal components or the base signal component, at least one of a signal component amplitude or a signal component phase associated with the respective at least one signal component; and wherein the transducer is configured for providing each signal component having the predetermined signal component amplitude or a signal component phase associated therewith, so as to obtain the acoustic input signal having a desired envelope.

14. The scanning probe microscopy system according to claim 11, wherein the system, using the transducer, is configured for the signal components to include:

two or more base signal components having different respective carrier frequencies; and a plurality of additional signal components associated with each base signal component;

wherein the carrier frequency and the additional frequencies of each base signal component and associated additional signal components of the base signal component, together form a group of frequencies associated the respective base signal component, so as to form two or more groups of frequencies, wherein the frequencies of each group of frequencies are distributed with an equal group difference frequency between each two subsequent frequencies of the group of frequencies, and wherein the group difference frequency is a frequency below the sensitivity threshold frequency.

15. The scanning probe microscopy system according to any of the claim 14, wherein the system, using the transducer, is configured for providing the signal components such that at least one condition is met from the group consisting of:

the group difference frequencies of the two or more groups of frequencies are equal;

a difference between respective carrier frequencies of the two or more base signal components is a positive integer multiple times the group difference frequency of at least one of the groups of frequencies; and the group difference frequencies of the two or more groups of frequencies are different.

16. The scanning probe microscopy system according to claim 11, wherein the transducer is arranged for producing the acoustic input signal such that:

the carrier frequency is a frequency within a range of 5 MHz to 200 MHz.

* * * * *